United States Patent
Zhang et al.

(10) Patent No.: US 8,439,180 B2
(45) Date of Patent: May 14, 2013

(54) CONVEYOR CARGO HANDLING SYSTEM AND METHOD OF USE

(76) Inventors: Dianren Zhang, Tacoma, WA (US); Brian Hamill, Warminster, PA (US)

( * ) Notice: Subject to any disclaimer, the term of this patent is extended or adjusted under 35 U.S.C. 154(b) by 316 days.

(21) Appl. No.: 12/862,695

(22) Filed: Aug. 24, 2010

(65) Prior Publication Data

US 2011/0083943 A1 Apr. 14, 2011

Related U.S. Application Data

(60) Provisional application No. 61/250,674, filed on Oct. 12, 2009.

(51) Int. Cl.
*B65G 63/00* (2006.01)
*B65G 47/40* (2006.01)

(52) U.S. Cl.
USPC ............. 198/369.5; 198/369.7; 198/586; 198/817; 198/861.6; 414/139.9; 414/140.2; 414/140.8

(58) Field of Classification Search ............... 198/369.5, 198/369.7, 583, 586, 817, 861.1; 414/139.9, 414/140.3, 141.3, 140.2, 140.8, 139.4
See application file for complete search history.

(56) References Cited

U.S. PATENT DOCUMENTS

| | | | | |
|---|---|---|---|---|
| 3,543,952 A | * | 12/1970 | Young | 414/140.3 |
| 3,799,365 A | * | 3/1974 | Sullivan et al. | 198/349.7 |
| 4,093,084 A | * | 6/1978 | Ringer | 414/343 |
| 5,080,019 A | * | 1/1992 | Takemura et al. | 104/88.03 |
| 5,884,746 A | * | 3/1999 | Leisner et al. | 198/346.1 |
| 6,554,121 B1 | * | 4/2003 | Halbesma | 198/349 |
| 6,554,557 B1 | * | 4/2003 | Takehara et al. | 414/140.3 |
| 7,686,558 B2 | * | 3/2010 | Tian et al. | 414/139.9 |
| 7,756,603 B1 | * | 7/2010 | Delaney et al. | 700/230 |
| 8,087,867 B2 | * | 1/2012 | Tian | 414/141.3 |
| 2005/0269184 A1 | * | 12/2005 | Enya | 198/369.2 |

* cited by examiner

*Primary Examiner* — Mark A Deuble
(74) *Attorney, Agent, or Firm* — Mark S. Hubert

(57) ABSTRACT

A conveyor cargo handling system for the synchronized, computerized loading and unloading of cargo containers from a vessel is comprised of at least two conveyor lines. Individually powered conveyor units, idler conveyor units, translate powered conveyor modules ("TPCM"), and rotate powered conveyor modules ("RPCM"), are remotely computer coordinated to operate in concert to safely and efficiently control traffic flow on the container terminal. The system eliminates much of the ground transportation conventionally utilized to move cargo containers to their storage destination.

12 Claims, 19 Drawing Sheets

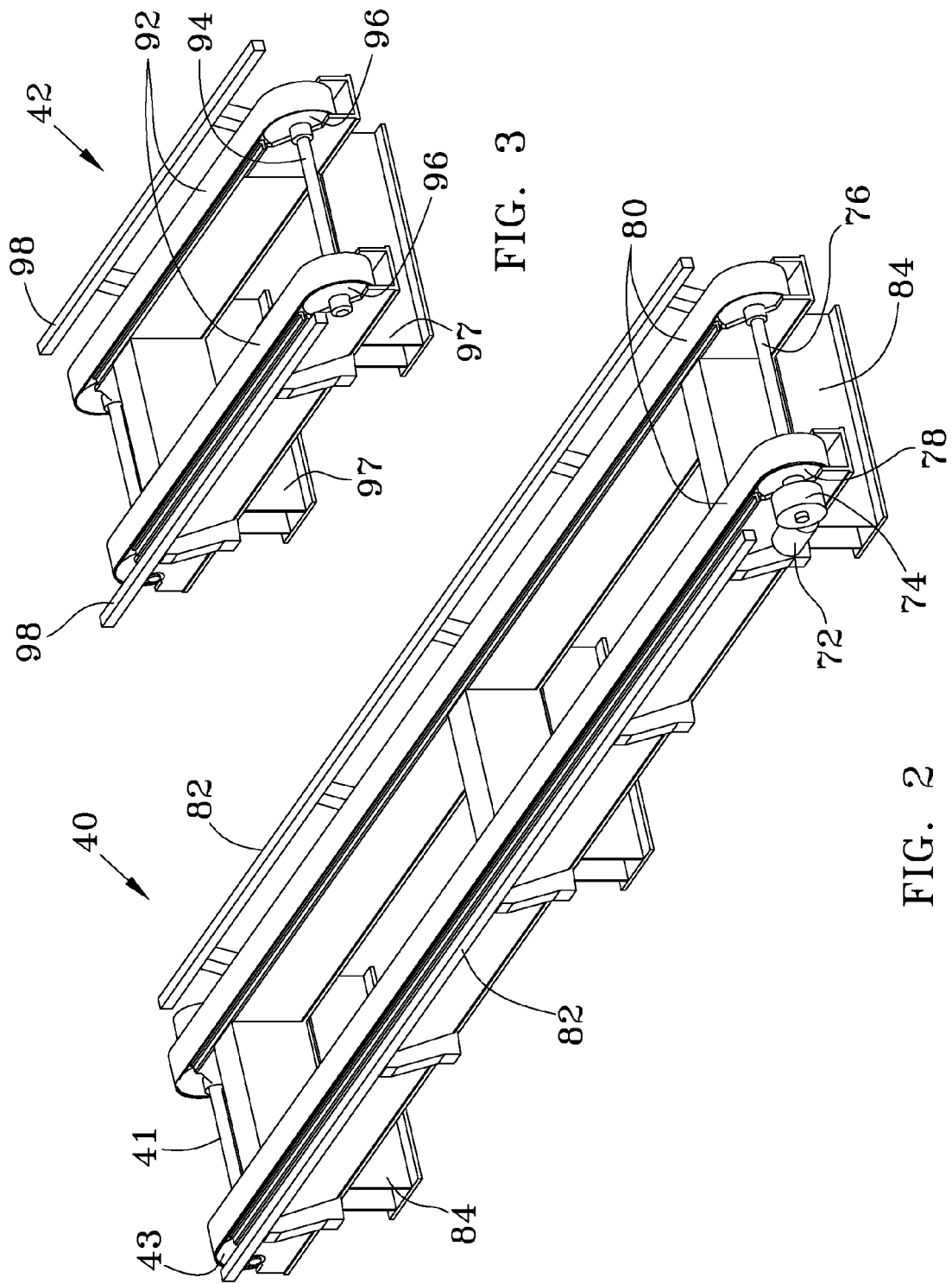

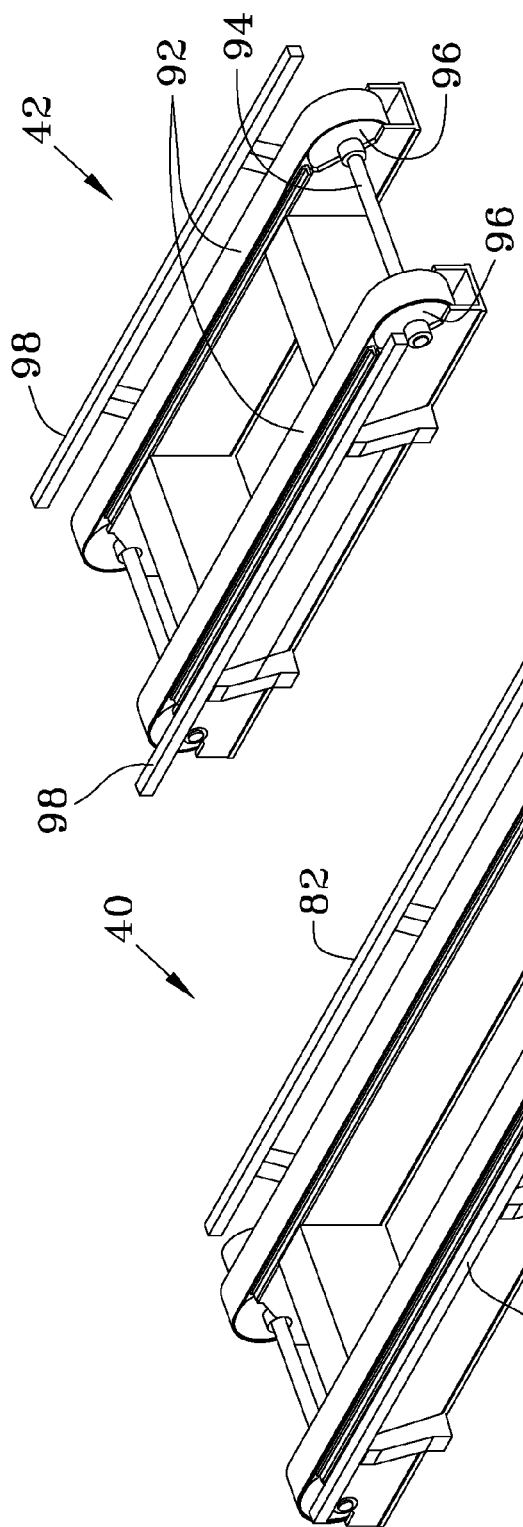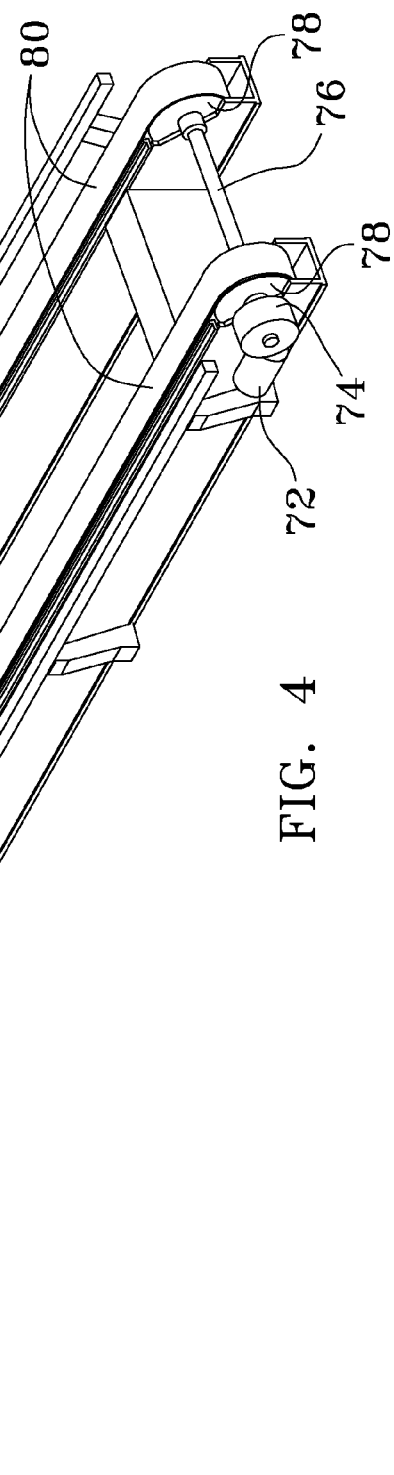
FIG. 4
FIG. 5

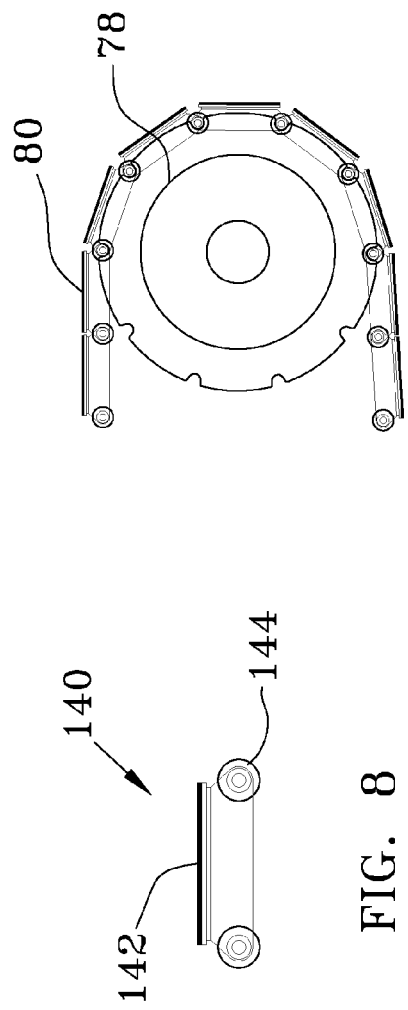
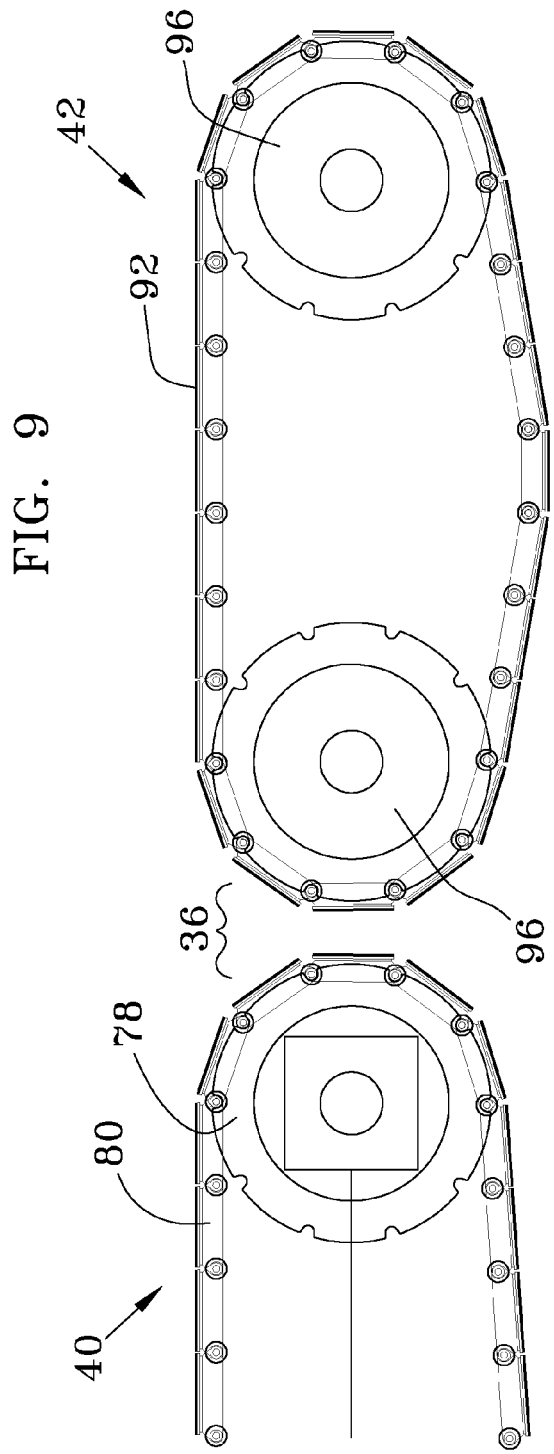
FIG. 8
FIG. 9
FIG. 10

CONVEYOR CARGO HANDLING SYSTEM AND METHOD OF USE

Applicants claim priority of U.S. Provisional Patent Application 61/250,674 entitled "Conveyor Cargo Handling System and Method of Use," filed Oct. 12, 2009, and incorporates by reference all material therein.

BACKGROUND OF THE INVENTION

The present invention is related to the field of cargo handling, and more particularly, to a conveyor assembly system and method of use for efficiently moving cargo containers in or from a ship to the backlands of a container terminal, where the containers can either be stacked for storage or loaded on trucks or trains for land transport.

Maritime container terminals are faced with a high volume of traffic, limited land, and ever increasing vessel size. Efficient unloading/loading of ISO containers, their storage, and their retrieval, is critical to the successful running of a maritime terminal.

Containers arriving by sea to a conventional terminal yard are removed from ships by massive Ship To Shore (STS) cranes that place the containers on yard transporters, which transport the containers to and from the ship load/unload site and to/from the stacking/storage area. An inventory of two-weeks or more can be stored in a yard, wherein containers are stored in blocks (e.g. a storage block of length of 10, width of 6, and height of 4 or 5 containers). Gantry cranes are then used to "dig-out" containers on lower levels of the storage blocks, moving the containers to either highway trucks, railroad cars, or back of yard transporters for return to the ship. This process of loading and unloading a vessel, and the movement of the ISO containers around the terminal yard is cumbersome and time intensive.

Without exception container terminal throughput has been limited by backland operations rather than by STS Crane productivity. For decades, experienced container terminal planners have recognized that fact but have yet to design a major terminal with backland productivity that can fully match peak STS productivity.

At first glance direct transfer from ship to train rail seems a logical way to go. However, rail cars do not fit ship hatch and the STS crane spacing that must align with ship hatches. Even if they did fit, the train of rail cars would move as a unit so the productivity of a fleet of four or five cranes would be limited by the slowest individual crane unless every crane had its own dedicated rail line.

A conventional conveyor similar to what is used for bulk cargo eliminates the hatch spacing issue but containers cannot be loaded or unloaded from a moving conveyor. Again, for a fleet of cranes the slowest crane would set the fleet productivity unless every crane had its own dedicated conveyor.

In an attempt to increase productivity, container terminals can also employ automated yard transporters called automatic guided vehicles ("AGV"), and in the some of the world's most technologically advanced maritime terminals the AGVs feed ISO containers to automated storage and retrieval systems ("AS/RS"). For most container terminals complete automation is not financially feasible. In addition to cost, when AGVs are employed in a yard no human traffic is allowed on the yard due to safely concerns, and the yard must be paved and accordingly provided with a adequate drainage system for smooth operation of the AGVs.

It would be advantageous to provide an improved cargo handling system that obviates the aforementioned storage and stacking logistical problems in a cost effective manner.

SUMMARY OF THE INVENTION

The present invention provides a conveyor cargo handling system that is capable of efficiently and effectively transporting cargo containers between the dock and the terminal backlands, where the containers are stored. Individually powered conveyor units, idler conveyor units, translate powered conveyor modules ("TPCM"), and rotate powered conveyor modules ("RPCM"), are remotely computer coordinated to operate in concert to safely and efficiently control traffic flow on the container terminal. A unique aspect of this system is that a container being conveyed can stop or travel at a different speed than other containers traveling on the same conveyor line. Additionally, containers traveling on the same line can move in opposite directions. Another important feature is that a malfunctioning conveyor unit or idler unit can be lifted out of the line and replaced with another modular unit while the malfunctioning segment is taken to the terminal's maintenance shop for repair or manual replacement/maintenance of unit components can be performed safely from beneath the conveyor line while other lines continue to operate. Scheduled service can be done in situ or in the terminal's maintenance shop. The use of the idler (non-motorized) conveyor segments reduces the cost of operation along with the fact that only the units beneath the moving container need be sequentially powered at one time. The modular conveyor system and even the rail mounted gantry crane rails can be elevated one or two meters and structurally supported on inexpensive pipe pin piles. Except for vehicle access there is no need for paving or complicated surface drainage systems.

Dock worker exclusion for safety reasons has been a huge problem for automated terminal planners. However, dock worker safety has not been a reason to exclude workers from working near elevated bulk conveyors. For the same reasons, an elevated modular conveyor system offers similar safety for dock workers and should not require excluding maintenance and the few other workers needed inside an automated terminal for manual activities.

BRIEF DESCRIPTION OF THE DRAWINGS

FIG. 1A is a perspective view of a container yard equipped with an embodiment of the conveyor cargo handling system;

FIG. 1B is a perspective view showing two ISO containers, one on an inner dock conveyor line and one on an outer dock conveyor line;

FIG. 1C is a perspective view showing movement of the two ISO containers of FIG. 1B one approaching the backlands conveyor lines, and the other side-shifting from inner dock conveyor line to an outer dock conveyor line;

FIG. 1D is a perspective view showing both ISO containers located on outer dock conveyor line, one container has stopped on a TPCM, and the other container is waiting for TPCM to transfer the first container to the RPCM;

FIG. 1E is a perspective view showing one ISO container located on outer dock conveyor line and a second ISO container being side-shifted, while the RPCM is rotating to align with the TPCM;

FIG. 1F is a perspective view showing one ISO container located on outer dock conveyor line a second ISO container located on a TPCM, and a RPCM aligned with a TPCM;

FIG. 1G is a perspective view showing one ISO container located on outer dock conveyor line and a second ISO container located on a RPCM;

FIG. 1H is a perspective view showing one ISO container located on outer dock conveyor line and a second ISO container located on a RPCM and aligned with a second RPCM;

FIG. 1I is a perspective view of one ISO container stopped on a TPCM and a second ISO container located on a backland conveyor line;

FIG. 1J is a perspective view of the container yard showing one ISO containers located on TPCM ready to load onto a RPCM and a second ISO container located on a RPCM, ready to be rotated to secondary backland conveyor line;

FIG. 1K is a perspective view of one ISO container located on a TPCM and aligned with a RPCM, and a second ISO container located on a RPCM aligned with a third backland conveyor line;

FIG. 2 is a perspective view of a powered conveyor unit with the foundation accessory;

FIG. 3 is a perspective view of a idler conveyor unit with the foundation accessory;

FIG. 4 is a perspective view of a powered conveyor unit without the foundation accessory;

FIG. 5 is a perspective view of a idler conveyor unit without the foundation accessory;

FIG. 8 is a side view of a single roller chain segment;

FIG. 9 is a side partial side view of several of the roller chain segments that comprise the conveyor transport surface around the roller chain sprocket; and FIG. 10 is a partial side view of a powered drive conveyor unit adjacent a idler conveyor unit.

DETAILED DESCRIPTION OF THE DRAWINGS

Figure 1A:
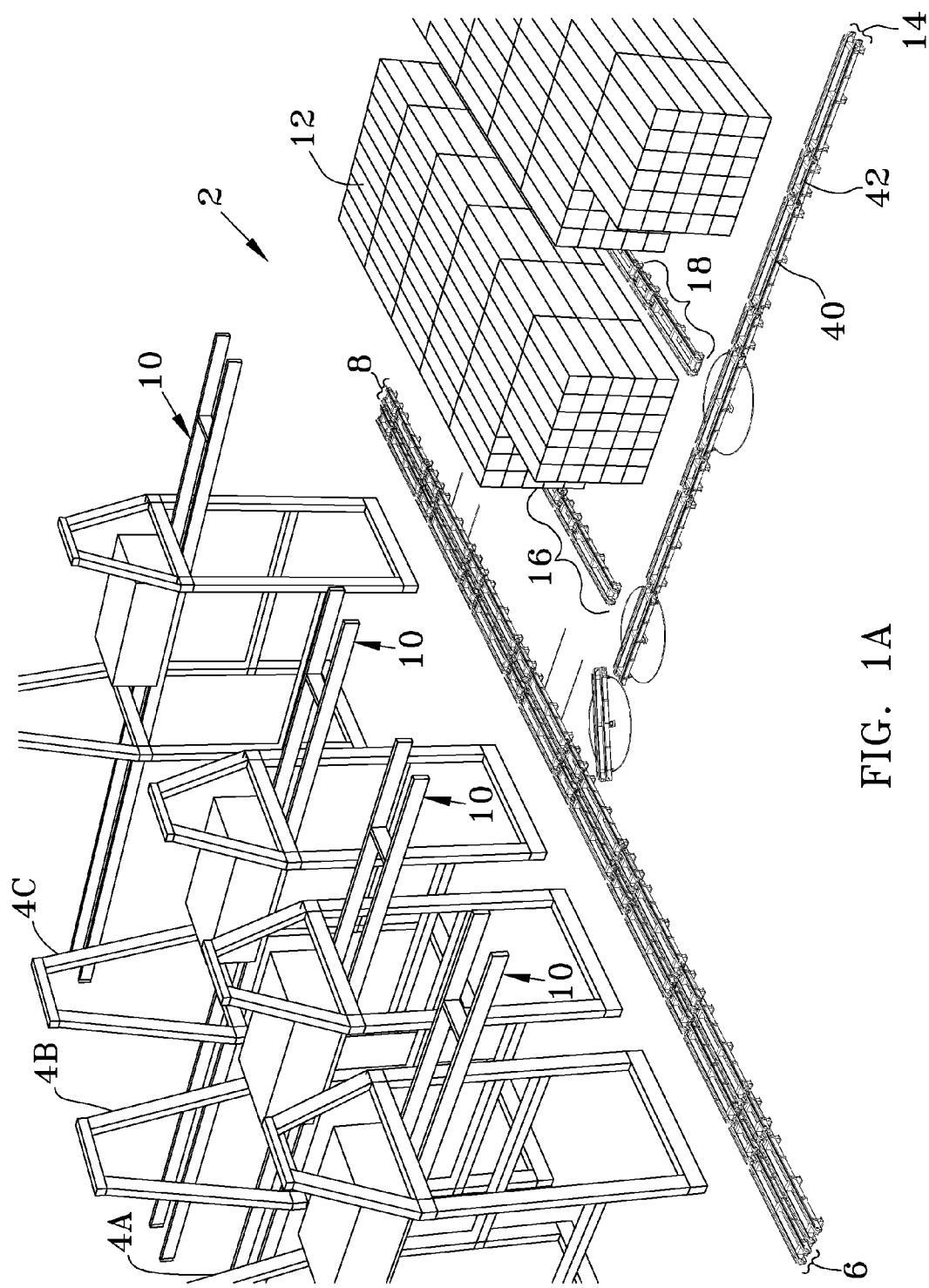
FIGS. 1A to 1K are sequential illustrations depicting the movement of ISO containers about the container yard utilizing the conveyor cargo handling system of this invention. They are intended to illustrate movement of the ISO containers throughout the conveyor cargo handling system in a sequential time progression.
Figure 1B:
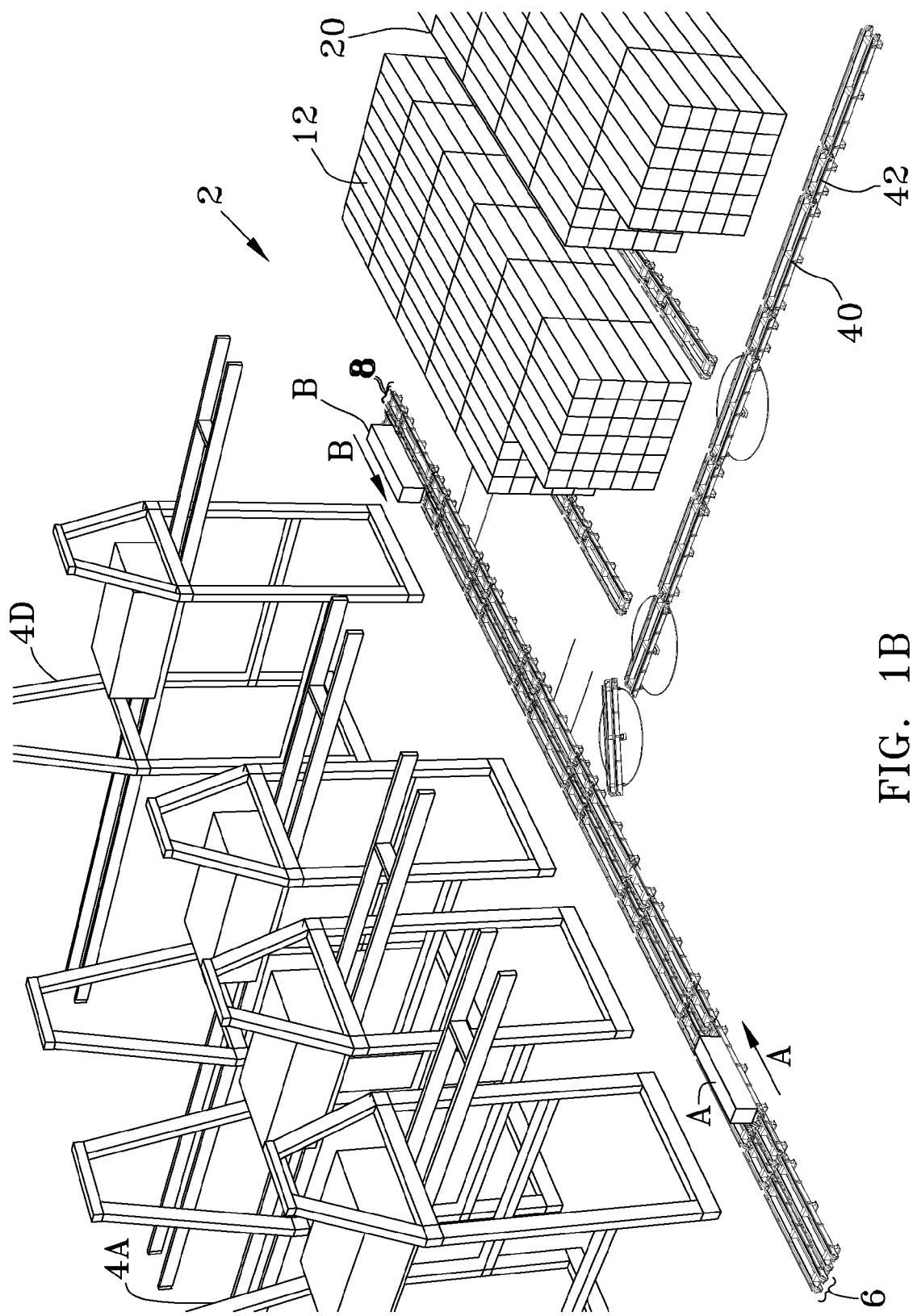

Looking at FIG. 1A-1K a sequential progression through time of ISO container movement from the cargo ship to the backland container stacks via the cargo handling system of the present invention is illustrated. It should be noted that FIGS. 1A-1K, illustrate just one scenario of moving ISO containers through the backlands of a container yard. The "progression in time" related to one container may be concurrent with the "progression in time" related to the other container. In an actual application with multiple containers being transported all containers may be stopped in a queue or being conveyed, side-shifted, or rotated concurrently. Referring to FIGS. 1A and 1B, a perspective view of a container yard 2 can be seen. A fleet of four STS cranes 4A, 4B, 4C, and 4D are working a section of a cargo ship (not visible). Two primary conveyor lines, an inner dock conveyor line 6 and an outer dock conveyor line 8 are located under the backreach 10 of the STS cranes 4A-D and extend at least for the full length of the STS cranes runway. A backland conveyor line 14 resides perpendicular or generally perpendicular to outer dock conveyor line 8, while first secondary backland conveyor line 16 runs parallel or generally parallel to first backland container stack 12, and second secondary backland conveyor line 18 runs parallel or generally parallel to second container stack 20. All conveyor lines, whether dock or backland are comprised of powered conveyor units 40 and idler conveyor units 42, which can be alternating or interspersed throughout. The layout of embodiment of the cargo conveyor handling system depicted in FIGS. 1A-1K is appropriate when the backland container stacks are oriented parallel or nearly parallel to the dock (not visible).

FIG. 1B, shows two ISO containers; container A and container B. Containers A and B have been unloaded from the container ship via container crane 4A and crane 4D, respectively, and placed directly on one of the dock conveyor lines; container A has been placed on outer dock conveyor line 8, while Container B has been unloaded directly onto inner dock conveyor line 6. The direction in which Container A is traveling is indicated by Arrow A, and the direction in which Container B is traveling is indicated by Arrow B. Both Containers A and B have an ultimate destination of being stored in the backland container stacks (12 or 20).

Figure 1C:
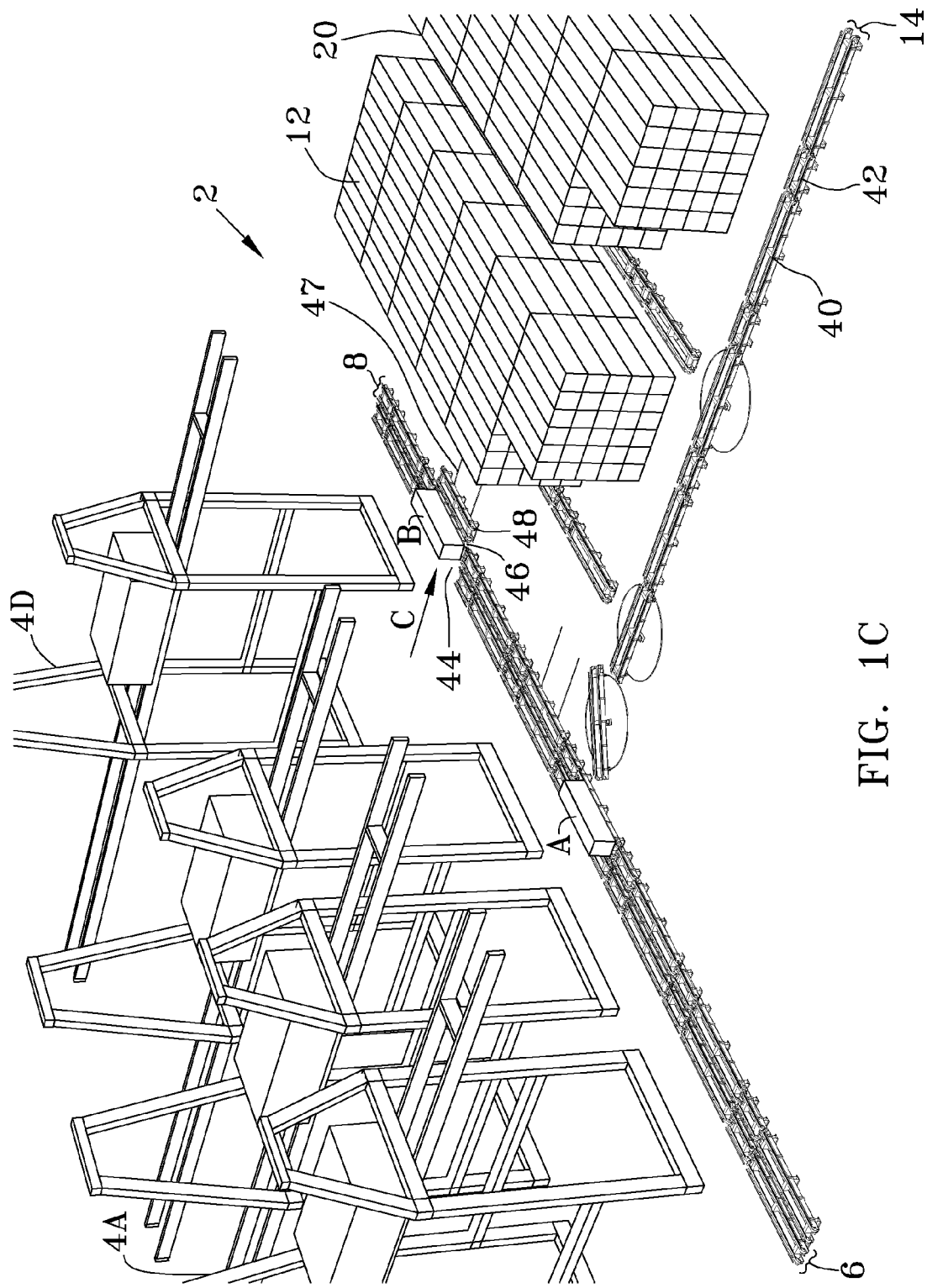

In FIG. 1C it can be seen that Container A has progressed in its journey and is now located on outer dock conveyor line 8 adjacent to backland conveyor line 14. Container B has been translated from inner dock conveyor line 6 to outer dock conveyor line 8 via inner dock TPCM 46. TPCMs are modified powered conveyor units mounted on rails 47. FIG. 1C illustrates how inner dock TPCM 46 translates contemporaneously with first outer dock TPCM 48 in a direction perpendicular or generally perpendicular to inner and outer dock conveyor lines 6, 8. The direction of the translation is indicated by Arrow C. After the translation of Container B from inner dock conveyor line 6 to outer dock conveyer line 8 a first space 44 is created in inner dock conveyor line 6, and first outer dock TPCM 48 translates to a position parallel to outer dock conveyor line 8.

Figure 1D:
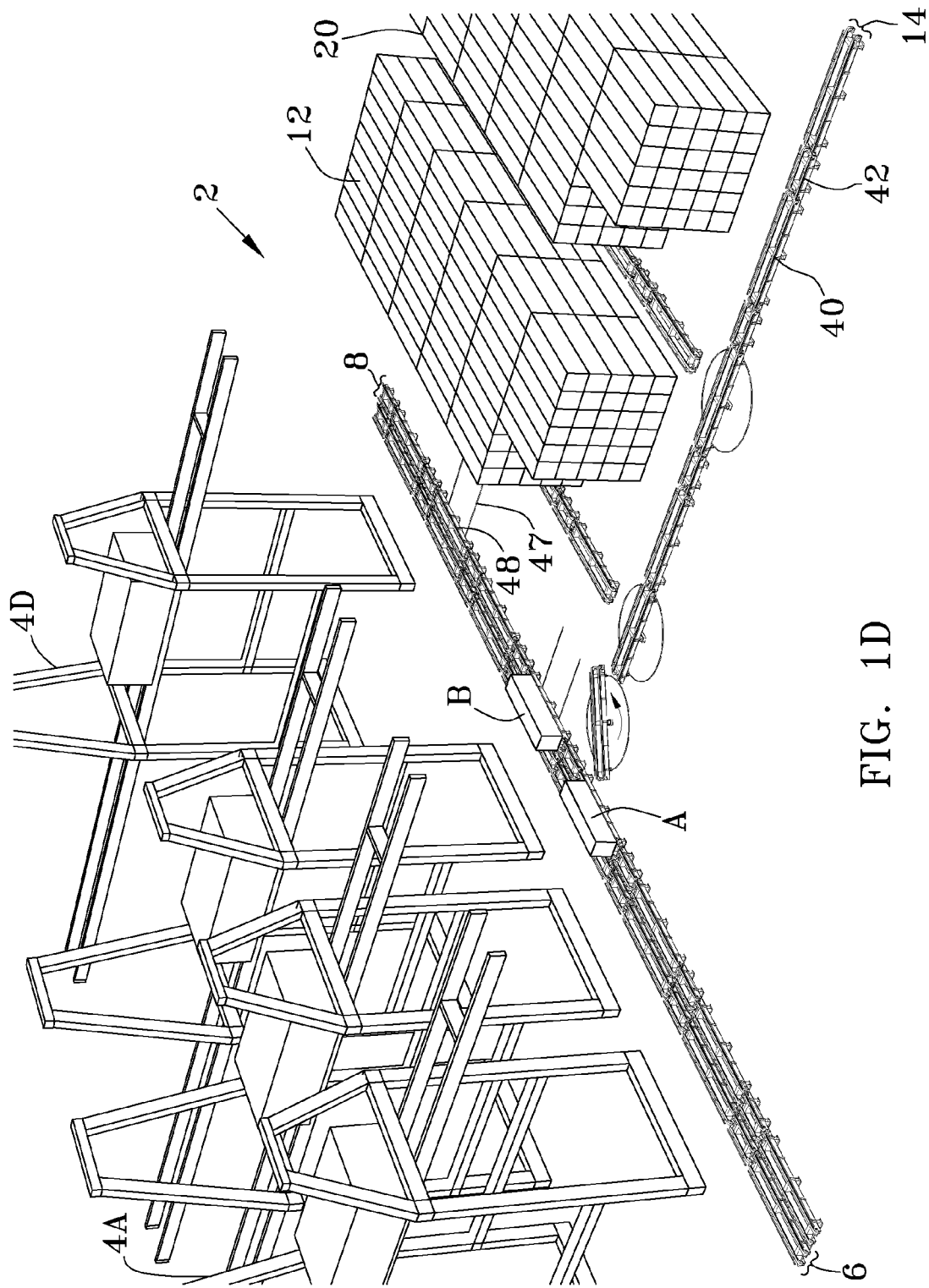
Figure 1E:
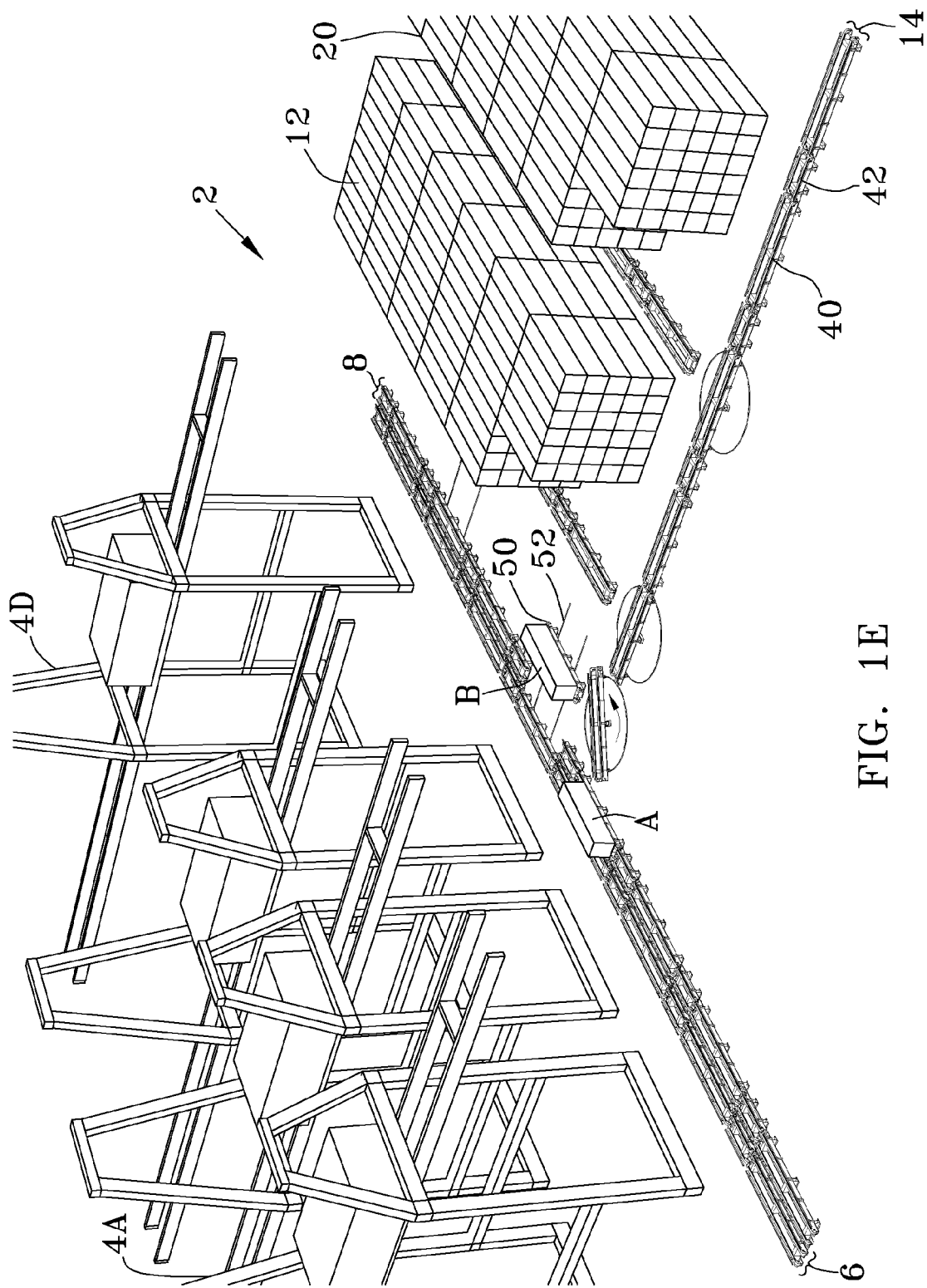

Turning now to FIGS. 1D and 1E, Container A remains in the same position as it was in from FIG. 1C, while Container B has progressed closer to backland conveyor line 14, but has stopped at a second outer dock TPCM 50. The rails 52 of second outer dock TPCM 50 can be seen.

In FIG. 1E, Container B has translated along rails 52 and now resides in a position parallel to outer dock conveyor line 8. Container A remains idle in its position from FIG. 1C.

Figure 1F:
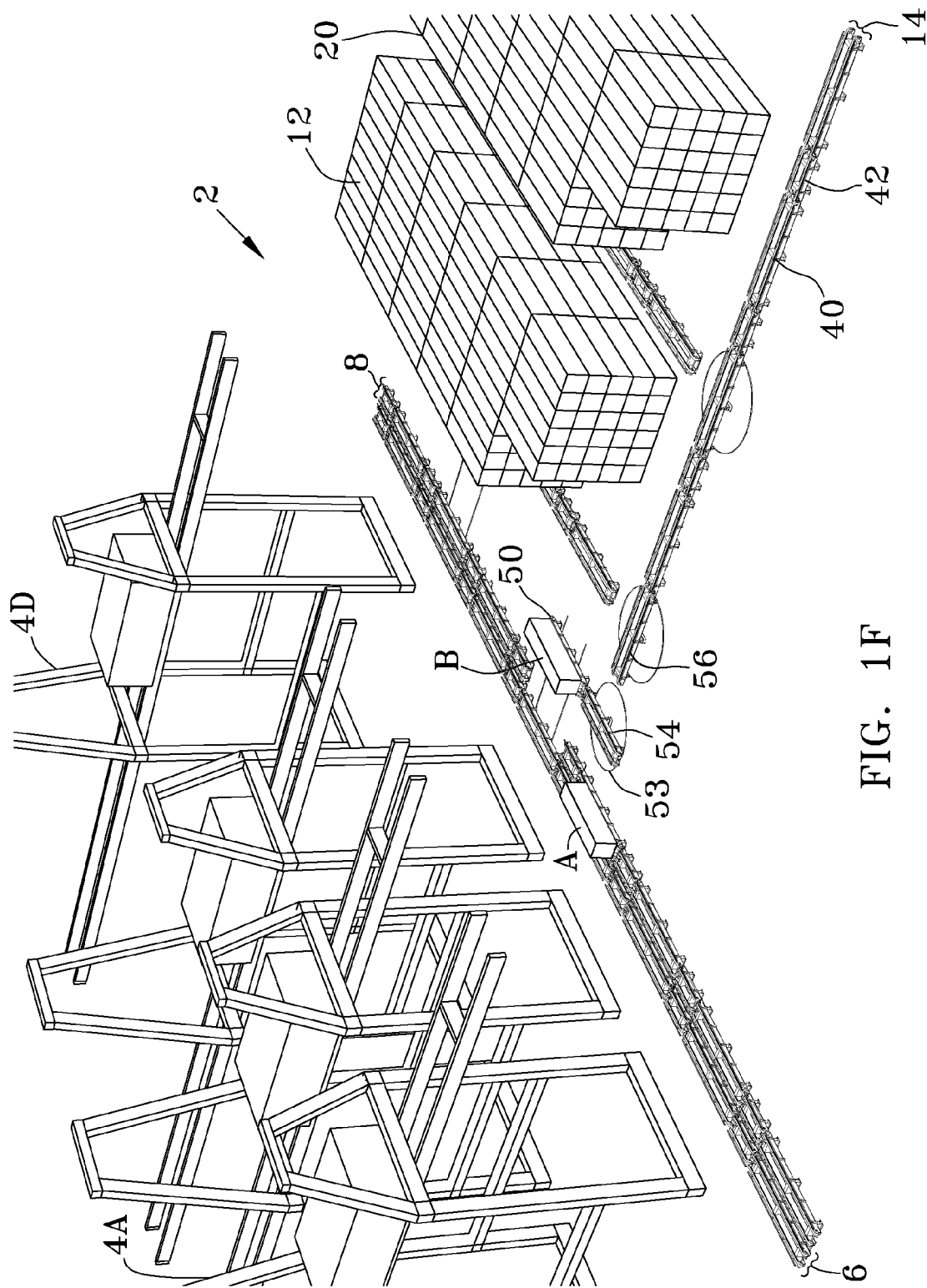
Figure 1G:
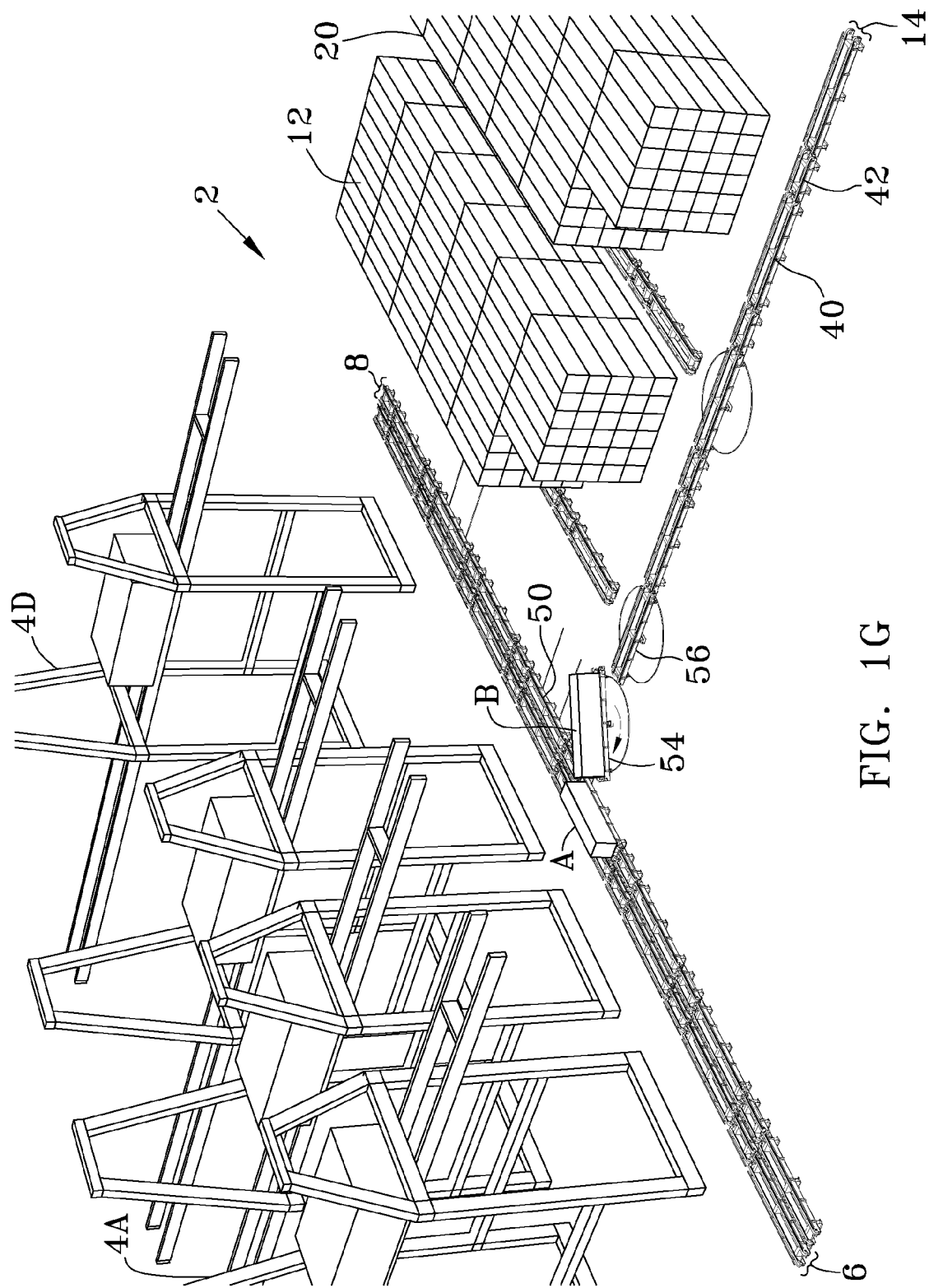
Figure 1H:
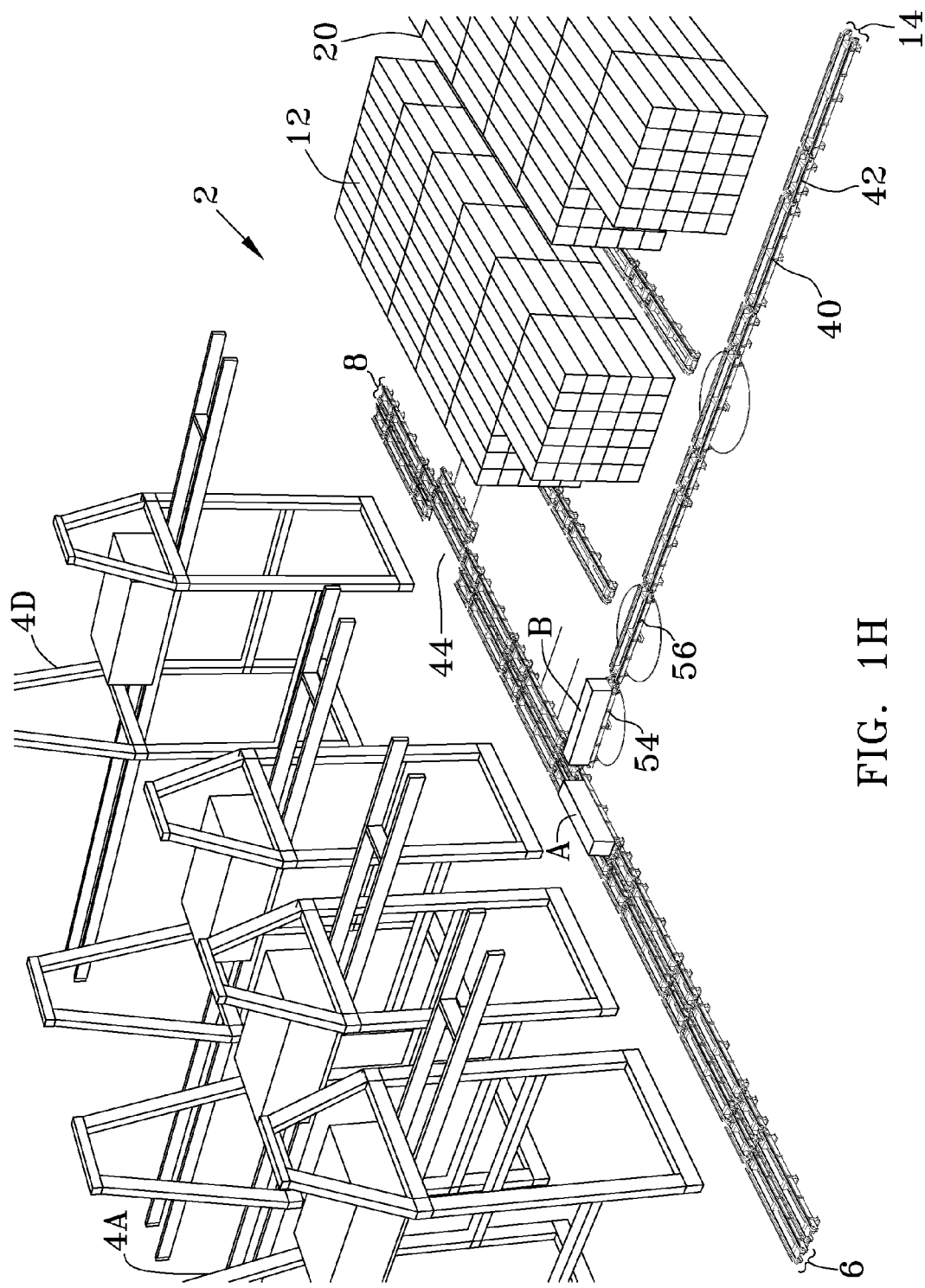

Referring to FIG. 1F, first RPCM 54 rotates to meet TPCM 50, while Container A remains idle in its position from FIG. 1C. RPCMs are modified powered conveyor units mounted on circular rails 53 to enable 360° rotation. It should be noted that in actual operation, Container A would be conveyed to TPCM 50 concurrent with RPCM 54 rotating to meet RPCM 56. In FIG. 1G. First RPCM 54 has now received Container B and is rotating to meet second RPCM 56. Looking at FIG. 1H it can be seen that Container A still remains idle in its position from FIG. 1C, and first RPCM 54 has rotated but is not yet aligned with second RPCM 56. Container A is now ready to be powered along backland conveyor line 14. Also shown for clarity is TPCM 46 side-shifted but not loaded with a container.

Figure 1I:
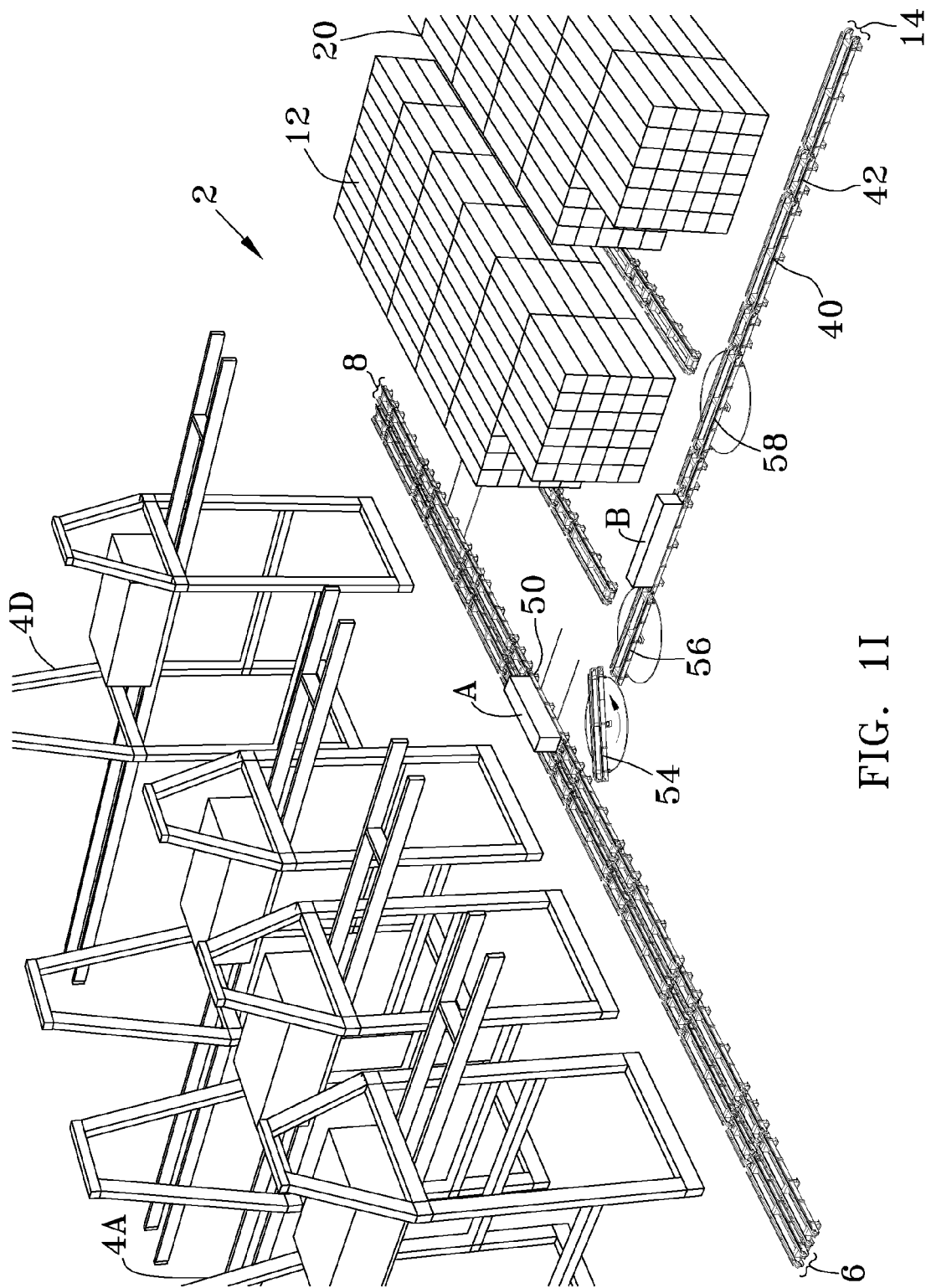
Figure 1J:
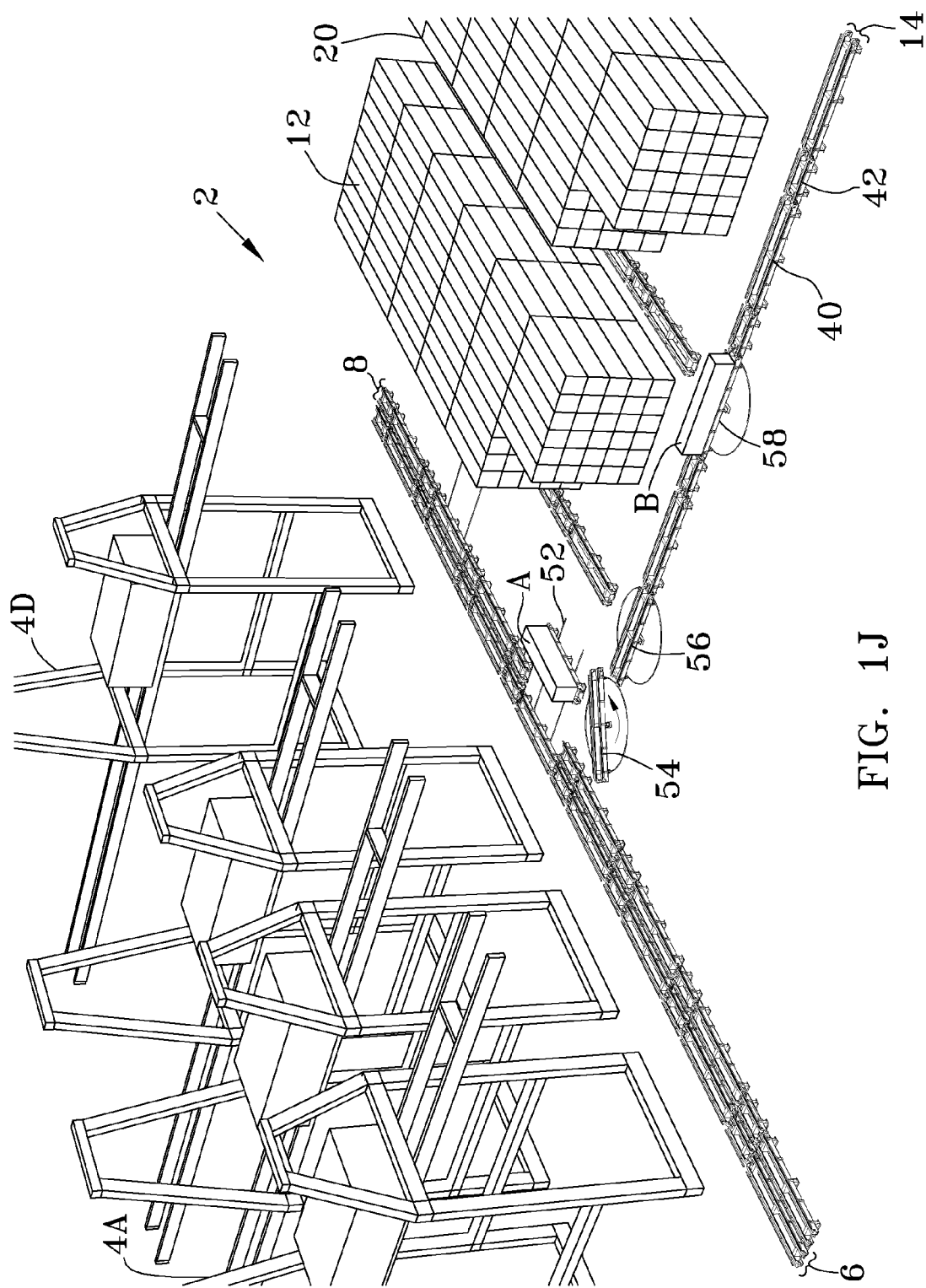
Figure 1K:
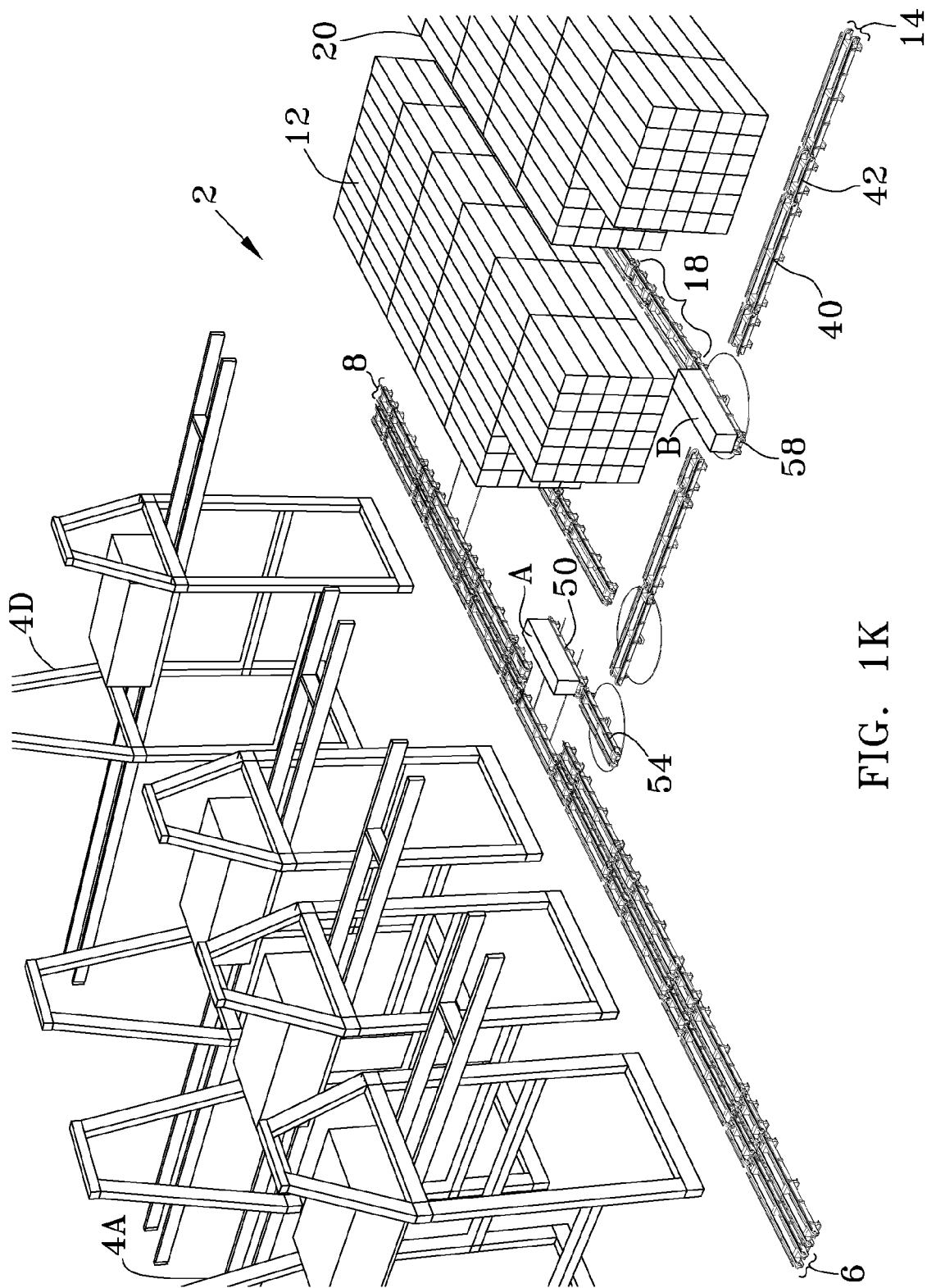

Turning to FIG. 1I, Container B has moved farther along backland conveyor line 14 in the direction of second container stack 20. Container A has now moved to second outer dock TPCM 50. In FIG. 1J, Container B has reached third RPCM 58, and Container A has translated along rails 52 and now resides in a position parallel to outer dock conveyor line 8. Finally, in FIG. 1K Container B has now been rotated via third RPCM 58 to align with second secondary backland conveyor line 18, while first RPCM 54 has rotated to align with second outer dock TPCM 50 so as to receive Container A. It should be noted that all TCPMs and RPCMs in the above description are mechanically equivalent. All references to "first," "second," "third" etc., are merely for ease of describing the possible movement of multiple cargo containers through the container yard as depicted in FIGS. 1A-1K.

Manual or automatic rail mounted gantry cranes (RMG's, as are well know in the art) can serve wherever needed to transfer ISO containers from backland conveyor lines to backland container stacks. Concurrent loading and unloading of a cargo ship would be possible if there were two or more backland conveyors lines for each backland container stack, working with an equal number of dock conveyor lines.

Looking at FIGS. 2 and 3, a single powered conveyor unit 40, (FIG. 2) and idler unit 42 (FIG. 3) can be seen. To accomplish the aforementioned scenario illustrated in FIGS. 1A-1K, dock and backland conveyor lines can be comprised of interspersing or alternating powered conveyor units 40 and idler conveyor units 42 (See FIG. 1A). In another embodiment the idler conveyor units may be eliminated.

Looking at FIG. 2 it can be seen that the drive assembly of the powered conveyor unit 40, comprises a drive motor 72, driving a gear box 74, coupled to and which spins front drive sprockets 78, coupled to either end of front axle 76, and upon which roller chain assemblies 80 are matingly engaged. The roller chain assembly forms a continuous loop by mating engagement about the rear drive sprockets 43, coupled to rear axle 41. Although only one drive assembly is visible in FIG. 2 in some situations, dual drive assembly components are utilized. In such a situation, the torque and power of the drive assembly is enhanced or supplemented by the use of additional drive motors 72 and gear boxes 74. These may be coupled to the rear drive sprocket 43 or the other front drive sprocket 78. Any size or combination of ISO containers 100 could be accommodated by selecting the length of the individual power conveyor units 40, to accommodate ISO containers 100 (See FIGS. 11 and 12). Through the use of the two drive sprockets mated to each axle the two sides of the each powered conveyor unit 40 are driven in unison.

To aid in the movement of ISO containers 100 along dock conveyor lines or backland conveyor lines, dual, opposing facing guide rails 82 are mounted adjacent and parallel to roller chain assembly 80. Guides rails 82 have a leaf spring action that cushions the impact when an ISO container 100 is dropped onto a powered conveyor unit 40 and aligns the container 100 along the longitudinal axis of the powered conveyor unit 40 and maintains the longitudinal alignment as it moves along a dock or backland conveyor line. Additionally, foundation accessories 84 can be mounted to power conveyor units 40, keeping power conveyor units 40 elevated off the ground, and allowing access for maintenance.

Figure 13:
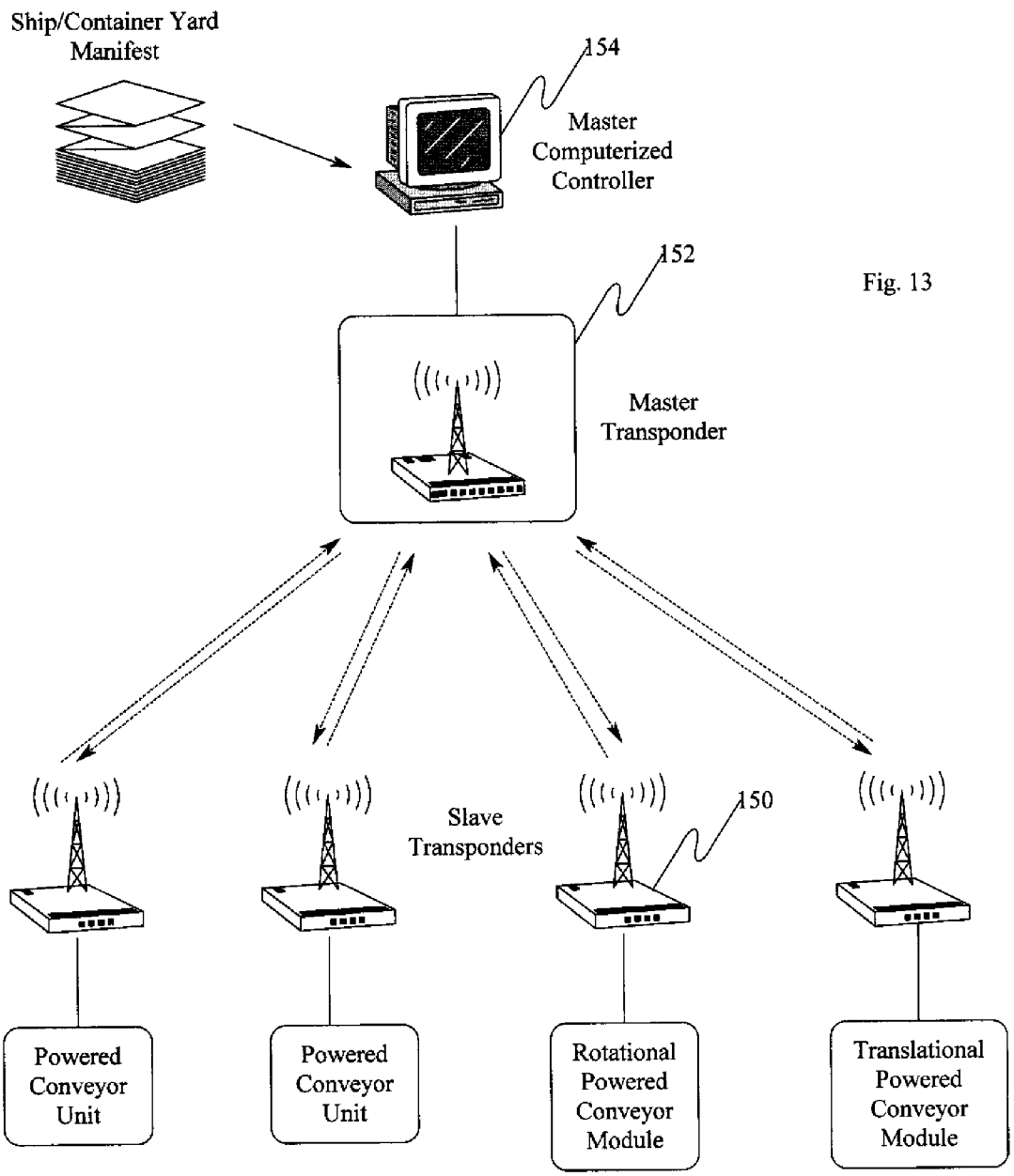
FIG. 13 is a diagrammatic representation of the cooperation between the elements of the system according to a first embodiment.
Figure 14:
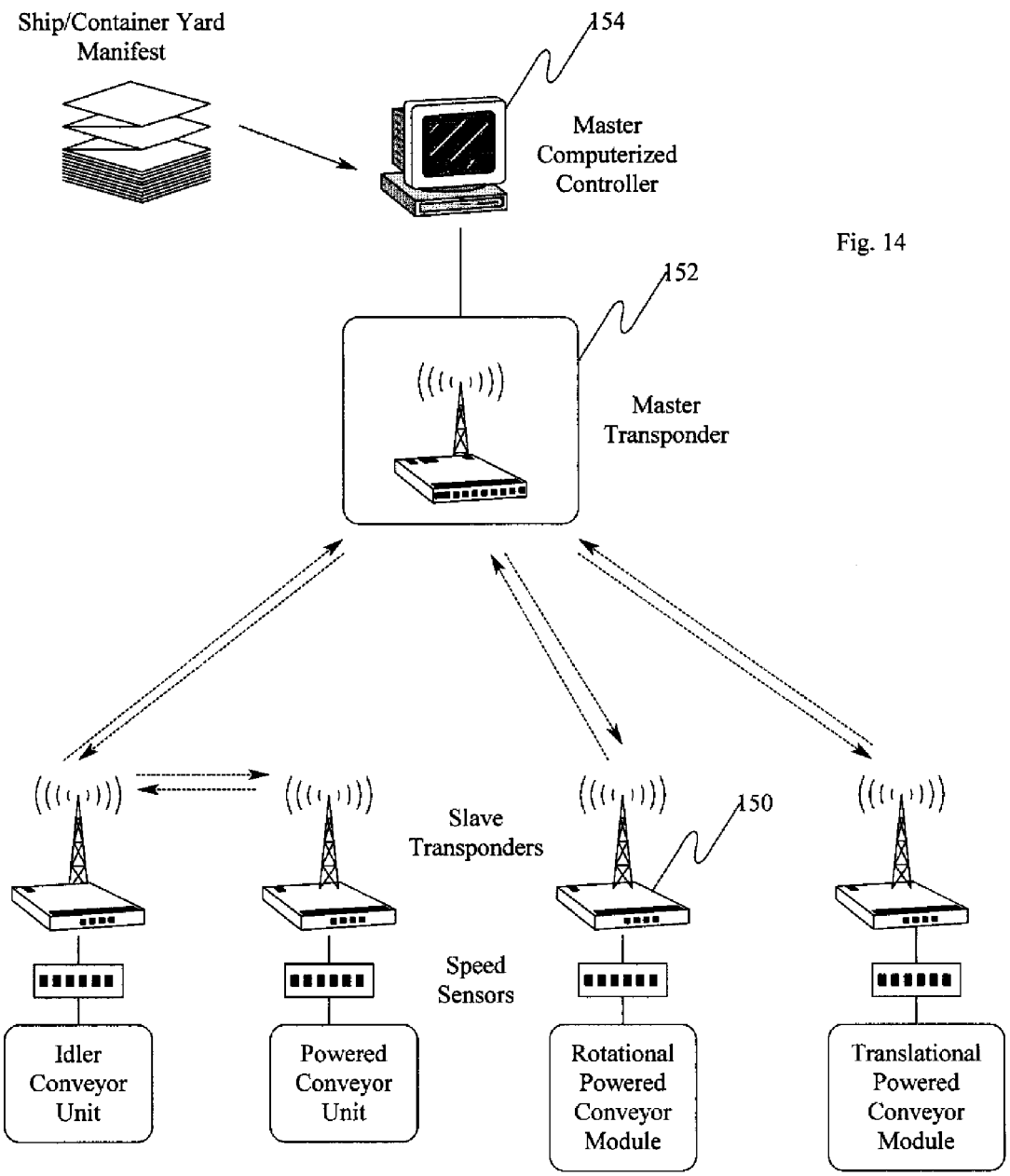
FIG. 14 is a diagrammatic representation of the cooperation between the elements of the system according to a second embodiment.

FIG. 3 depicts an idler conveyor unit 42. Idler conveyor unit 42 can be positioned between powered conveyor units 40. Idler conveyor unit 42 must be shorter than the shortest container, generally 10 to 12 feet in length. Idler conveyor units 42 are similar to the powered conveyor units 40, containing an idler chain 92 and idler sprockets 96, idler axle 94, idler guide rails 98 and idler foundation accessory 97, except idler conveyor units 42 have no drive motor 72 or gear box 74. Idler conveyor units 42 contain a speed sensor, and a wireless transmitter and receiver (slave transponder 150) to signal the next powered conveyor unit 40 to go the correct direction and speed to receive the container 100 (not illustrated) that has entered onto the idler conveyor unit 42. It should be noted that all slave transponders 150 are located beneath their corresponding units. They are placed there for protection from the elements to keep them out of container traffic and to allow for their repair/maintenance by workers safely positioned beneath the units. The various slave transponders are also controlled by signals generated by the master transponder 152 based on the transfer logic generated by the master computerized controller 154. (See FIG. 13) Idler conveyor units 42 also signal the preceding drive conveyer unit 40 when to stop, and it communicates with preceding idler conveyors 40 to signal when there is slow or stopped traffic (i.e. containers 100); thus, minimizing start/stop time, and bumper-to-bumper traffic on the container yard 2. There is a second embodiment of electronic control wherein the actions at each powered conveyor 40, and RPCMs 48, and RPCM 54 are controlled only by signals generated by the computerized master controller 154, relayed (See FIG. 14). Idler units 42 provide useful length to the overall dock and backland conveyor lines without the expense of additional motors, gearboxes, and shafts.

FIGS. 4 and 5 illustrate the powered conveyor unit 40 and idler unit 42, respectively, without the foundation accessory 84.

Figure 6:
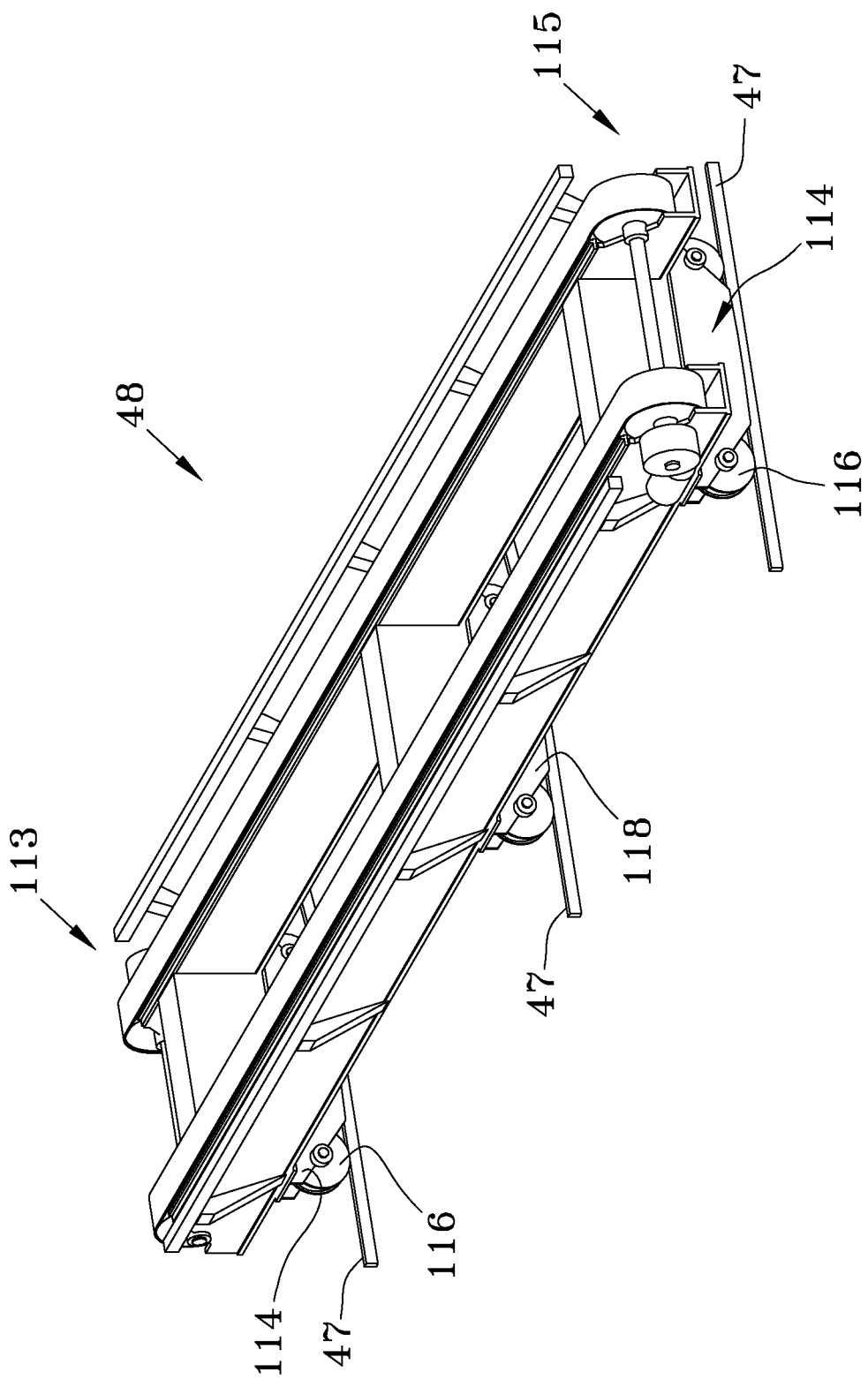
FIG. 6 is a perspective view of a TPCM.

FIG. 6 illustrates a TPCM 48. TPCMs 48 allow for ISO containers being transported along the dock or backland conveyor lines to side-shift in their movement. TPCMs 48 are modified powered conveyor units 40 comprising the same drive assembly, but mounted on a set of three linear rails 47 (two rails 47 instead of three could be employed as well). To allow movement on rails 47, dual driven truck accessories 114 located at the proximate end 115 and distal end 113 of the TPCM, comprise rail-mounted wheels 116 driven by electric motors coupled to gearboxes, as is well know in the industry. Additionally, idler truck accessory 118 is mounted between the proximate end 115 and distal end 113, but is not motorized. TPCM transponder units signaled by the computerized master controller or a master transponder coordinates the TPCMs movement.

Figure 7:
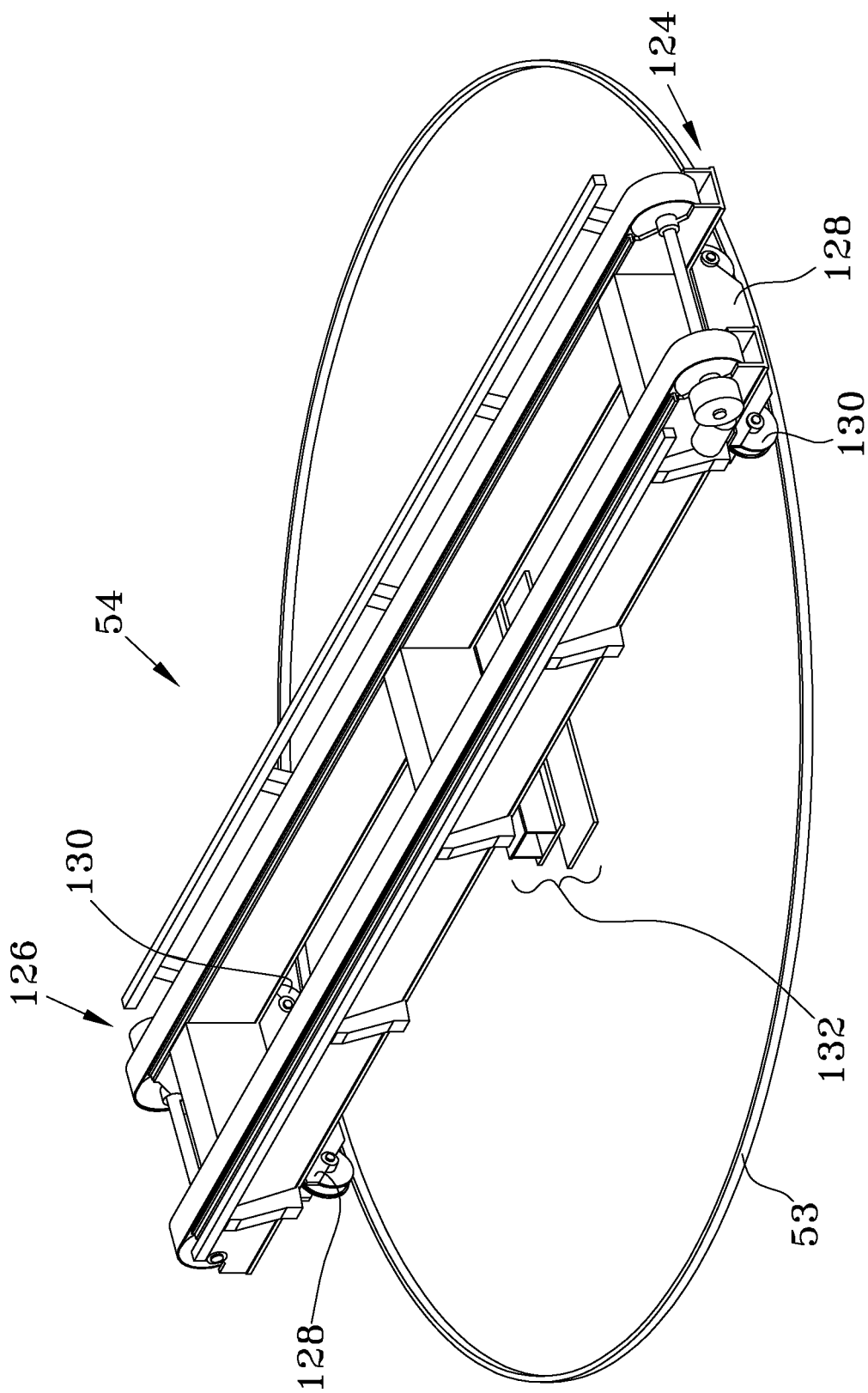
FIG. 7 is a perspective view of a RPCM.

Referring now to FIG. 7, a RPCM 54 can be seen. RPCMs 54 are modified powered conveyor units 40 comprising the same drive assembly, but mounted on a circular rail 53, to allow for 360° of rotation. At a first end 124 and second end 126 dual circular driven truck accessories 128, comprising circular rail-mounted wheels 130 can be seen. Additionally, a king pin assembly 132 about the midpoint of RPCM 54 allows for 360° of rotation. Operation of the RPCMs is accomplished in the same manner as that of the TPCMs above.

Referring now to FIGS. 2-7, the four mechanisms: powered conveyor units, idler conveyor units, TPCMs, and RPCMs, mechanically cooperate to offer container terminal Planners, Operators, and Industrial Engineers unlimited design flexibility to efficiently utilize the entire backland area or to convey to a nearby off-terminal stacking area. Multiple operating redundancies are easily achieved as well as custom organization of the various backland stacks by common attributes.

Power is provided by conventional conduit and wiring installed under the stationary conveyor supports. TPCMs need a festoon or cable track. RPCMs could require a slip ring but not if rotation is limited to plus or minus 90°.

A custom conveyor support structure for the powered conveyor units, idler conveyor units, TPCMs, and RPCM will be required. Bearing capacity of pavement or soil, desired height of top surface (i.e. roller chain assembly), space needed for maintenance, and suitable structural support for the pair of beams that support the pair of roller chains will all be factors of consideration.

Referring now to FIGS. 8-10 a partial roller chain assembly 80 of the powered conveyor units 40 and drive sprocket 78 are shown. Roller chain assembly 80 is comprised of roller chain segments 140. A roller chain assembly 80 rather than a unitary conveyor belt is utilized as the roller chain segments 140 serve as chain links and serve as cushioned container support and as such have a flexible, planar top 142. Planer top (surface) 142 allows for the support of standardized ISO containers 100 (FIG. 11), as is known in the art, as well as any other containers that have internal bottom framing, and a flush bottom surface. No load is transmitted from container 100 to powered conveyor unit 40 through the container corner castings (not shown). Bearings 144 are high speed, permanently lubed, accommodating any speed without overheating. The drive sprocket 78 moves the roller chain assembly 80 mechanically, not by friction. The only possibility for container slip is if the container 100 slides on the roller chain assembly surface (planar top 142).

In certain applications there may exist a possible need to bridge the gap 36 in the top surfaces where an idler conveyor unit 42 and drive conveyor unit 40 meet or in a similar maneuver where any two of the four modules (i.e. drive conveyor unit, idler conveyor unit, TPCM, and RPCM) meet. A simple roller would work to cut the gap 36 in half. Another possibility is to install a pin-connected link to set a fixed distance between sprocket centers. That link could also be a simple beam that supports a post that is topped with a roller bearing or roller ball assembly. The cushioned chain segments would absorb any tendency for the container to bump when crossing over the gap, since perfectly flat top surfaces, a perfectly rigid container, and perfectly equal gap lengths are unlikely.

Figure 11:
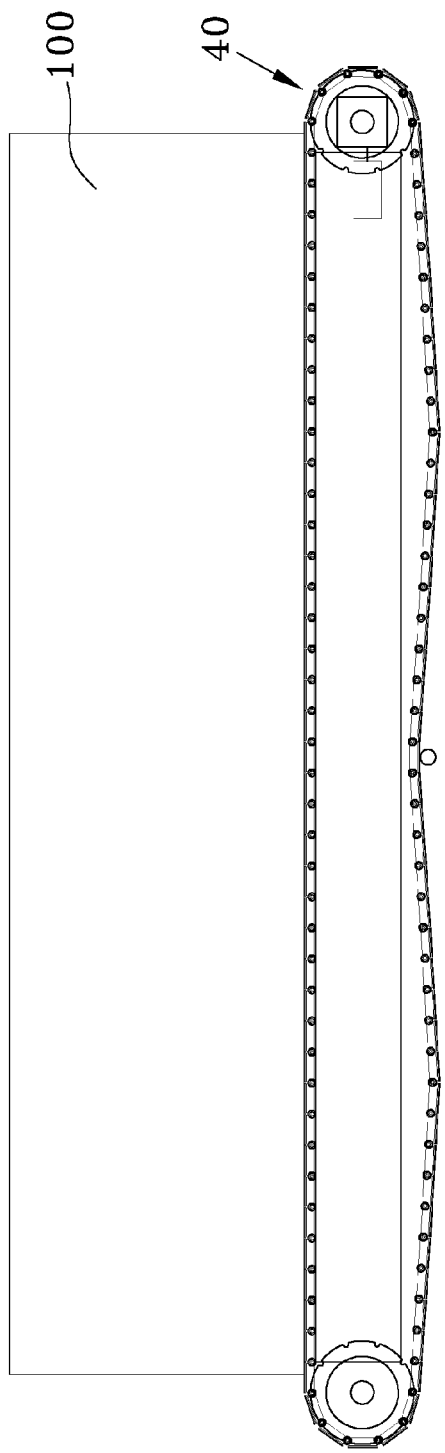
FIG. 11 is a side phantom view of a powered conveyor unit with an ISO container atop the unit.
Figure 12:
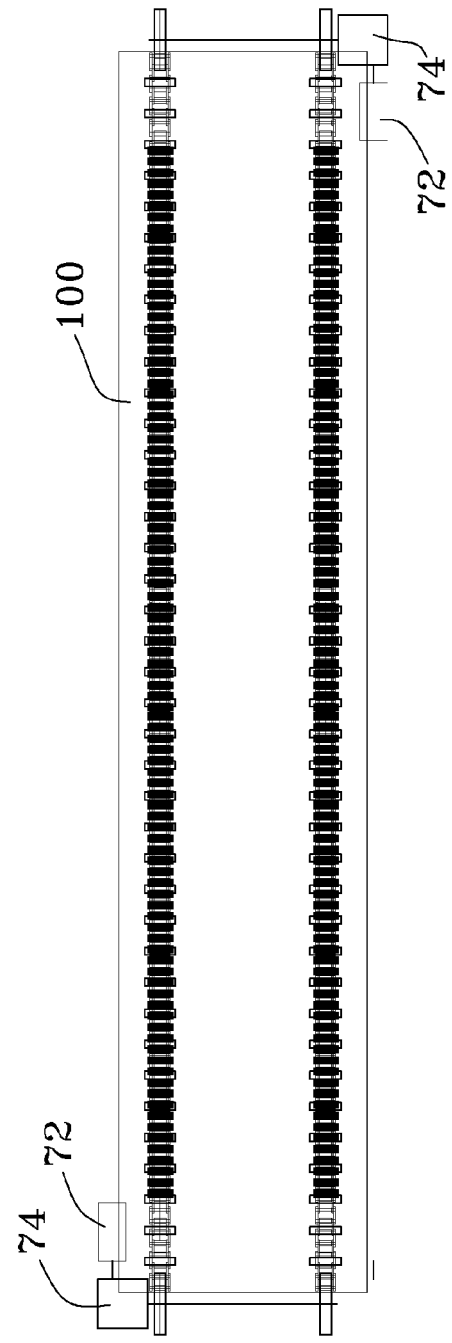
FIG. 12 is a top phantom view of a powered conveyor unit with an ISO container atop the unit.

Referring to FIGS. 11-12, FIG. 11 shows a phantom side view of a single powered conveyor unit 40, while FIG. 12 is a top phantom view of a powered conveyor unit with an ISO container atop the unit Any size or combination of containers 100 could be accommodated by selecting the length of the individual drive conveyors 40, to accommodate containers 100 with lengths of twin 20's with or without a 5 foot separation between each other, 40's, and 45's, since typical ISO containers are 20, 40, or 45 feet in length and 8 feet wide.

While the foregoing description describes the process of unloading a cargo ship, loading the cargo ship is just as easily accomplished by reversing the process. Cargo containers are simply moved from the backland container stacks to the cargo ship via the cargo handling system of the present invention.

The above description will enable any person skilled in the art to make and use this invention. It also sets forth the best modes for carrying out this invention. There are numerous variations and modifications thereof that will also remain readily apparent to others skilled in the art, now that the general principles of the present invention have been disclosed. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The invention claimed is:

1. A conveyor cargo handling system adapted for the movement of cargo containers around a container yard comprising:
    at least one primary conveyor residing parallel to a cargo ship dock;
    at least one secondary conveyor line residing at an angle to said cargo ship dock; wherein said primary and secondary conveyor lines comprise at least one powered conveyor unit and at least one idler conveyor unit and;
    wherein said primary and secondary conveyor lines are each a series of interchangeable, substantially similar powered drive conveyor units and interchangeable, substantially similar, idler conveyor units; and
    wherein said primary conveyor line further comprises at least one translate powered conveyor unit that is movably engaged on a fixed rail system for the transfer of cargo containers from said primary conveyor line to said secondary conveyor line.

2. The conveyor cargo handling system of claim 1 wherein said secondary conveyor line further comprises at least one rotate powered conveyor unit that is rotatably engaged on a fixed circular rail system for the rotation of cargo containers.

3. The conveyor cargo handling system of claim 2 wherein said powered conveyor unit comprises;
    at least one drive motor;
    at least one driving gear box;
    at least one drive sprocket;
    at least one axle; and
    at a roller chain assembly wherein said drive motor is matingly engaged with and drives said gear box, and wherein said gear box is matingly engaged with and spins said drive sprocket, and wherein drive sprocket is matingly engaged with and spins said axle upon which said roller chain assemblies are matingly engaged.

4. The conveyor cargo handling system of claim 3 wherein said powered conveyor unit further comprises opposing facing guide rails mounted adjacent and parallel to said roller chain assembly.

5. The conveyor cargo handling system of claim 4 wherein said powered conveyor unit further comprises at least one foundation accessory mechanically mounted to said power conveyor unit, said foundation accessory adapted for elevating said powered conveyor unit off of a ground.

6. The conveyor cargo handling system of claim wherein said roller chain assembly is comprised of roller chain segments said segments comprising;
    a flexible planar top; and
    high speed, permanently lubed bearings.

7. The conveyor cargo handling system of claim 4 wherein said roller chain assembly is comprised of roller chain segments said segments comprising;
    a flexible planar top; and
    high speed, permanently lubed bearings.

8. A conveyor cargo handling system of claim 1 wherein said primary conveyor and said secondary conveyor lines reside at an angle to said cargo ship dock.

9. A conveyor cargo handling system adapted for the movement of cargo containers around a container yard comprising:
    at least two adjacent and parallel, primary conveyor lines affixed to a first set of ground mounted foundation accessories that support said primary conveyor lines in a common plane that is raised above a ground level wherein said primary conveyor lines reside parallel to a cargo ship dock;
    at least one secondary conveyor line affixed to a second set of ground mounted foundation accessories that supports said secondary conveyor line in said common plane wherein said secondary conveyor line resides at an angle to said primary conveyor lines;
    at least one bi-directional powered conveyor unit having a first length and further comprising at least two drive motors, at least two driving gear boxes, at least two axles each with two drive sprockets mounted at opposite ends thereof, and at least two roller chain assemblies wherein said drive motors are matingly engaged with and drive said gear boxes which are engaged with and spin said axle mounted drive sprockets upon which said roller chain assemblies are rotatably enmeshed;

at least one bi-directional idler conveyor unit having a second length less than said first length and further comprising at least two rotatable sprockets upon which said roller chain assemblies are rotatably enmeshed, at least one bi-directional powered conveyor unit that is movably engaged on a fixed linear rail system mounted beneath said powered conveyor unit and adapted for the transfer of cargo containers between the two adjacent and parallel, primary conveyor lines in a translation movement;

at least one bi-directional powered conveyor unit that is rotatably engaged on a fixed circular rail system mounted beneath said powered conveyor unit and adapted for the rotational transfer of cargo containers between one of said primary conveyor lines and said secondary conveyor line or for the rotation of cargo containers within any conveyor line;

at least two opposing facing guide rails mounted adjacent and parallel to said roller chain assemblies on said powered, idler, translate and rotate conveyor units;

wherein said primary and secondary conveyor lines are comprised of a series of interspersed powered conveyor units, idler conveyor units, translate powered conveyor units and rotate powered conveyor units residing in said same common plane that are adapted for the organized loading and unloading of cargo containers, and wherein said primary conveyor lines reside parallel to a longitudinal axis of a cargo ship dock, and wherein a linear axis of said secondary conveyor line resides at an angle to a linear axis of said primary conveyor line.

10. A conveyor cargo handling system of claim 9 wherein the number of secondary conveyor lines is two and said secondary conveyor lines reside parallel to each other.

11. The conveyor cargo handling system of claim 10 further comprising:
- a remote master computerized controller adapted to generate operational signals for the powered conveyor units based on input transfer logic for the cargo containers;
- a remote master transponder electronically connected to said master computerized controller and adapted to send and receive said operational signals;
- at least one local slave transponder affixed to a idler conveyor unit and adapted to send and receive said operational signals to and from said master responder and to initiate mechanical operation of said powered conveyor units to transport said cargo containers.

12. The conveyor cargo handling system of claim 11 further comprising at least one local sensor on one of said conveyor units in electronic communication with said slave transponder to determine and relay positional information of any cargo containers on said conveyor cargo handling system to said master transponder and said master computerized controller.

* * * * *